United States Patent
Brundage et al.

(10) Patent No.: US 6,238,618 B1
(45) Date of Patent: May 29, 2001

(54) PRODUCTION OF POROUS MULLITE BODIES

(75) Inventors: Kevin R. Brundage, Corning; David L. Hickman; Merrill Lynn, both of Big Flats, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,711

(22) Filed: Sep. 30, 1999

Related U.S. Application Data

(60) Provisional application No. 60/102,621, filed on Oct. 1, 1998.

(51) Int. Cl.[7] .................................................. B28B 3/20
(52) U.S. Cl. ........................................ 264/638; 264/681
(58) Field of Search .................................. 264/630, 638, 264/669, 681

(56) References Cited

U.S. PATENT DOCUMENTS

| | | | |
|---|---|---|---|
| 4,295,892 | * 10/1981 | Matsuhisa et al. | 501/120 |
| 4,601,997 | 7/1986 | Speronello | 502/263 |
| 4,608,357 | 8/1986 | Silverman et al. | 502/84 |
| 4,628,042 | 12/1986 | Speronello | 502/263 |
| 4,826,790 | 5/1989 | Jones et al. | 501/80 |
| 4,921,616 | 5/1990 | Minjolle | 210/767 |
| 4,935,390 | 6/1990 | Horiuchi et al. | 501/128 |
| 4,950,628 | 8/1990 | Landon et al. | 501/119 |

FOREIGN PATENT DOCUMENTS

| | | |
|---|---|---|
| 42 26 276 | 2/1994 | (DE) . |
| 0130734 | 1/1985 | (EP) . |
| 0 236 249 | 1/1987 | (EP) . |
| 0425833 | 5/1991 | (EP) . |
| 9825685 | 6/1998 | (WO) . |

\* cited by examiner

*Primary Examiner*—Christopher A. Fiorilla
(74) *Attorney, Agent, or Firm*—Timothy M. Schaeberle

(57) ABSTRACT

Porous sintered ceramic materials having mullite as its primary phase and a method for producing them. The method includes preparing a plasticizable raw material mixture comprised, by weight, of 75 to 99% pre-reacted mullite powder, and 1.0 to 25% of a water-swelling clay, adding an organic binder system to the mixture and mixing the mixture to form an extrudable mixture, and extruding the mixture to form a substrate of the desired configuration. The green body is dried and fired for a time and at temperature sufficient to form a sintered mullite structure having a narrow through-pore size distribution comprised of pores exhibiting an average intrusion-pore size of between about 2–15 $\mu$m, and a total intrusion porosity, as measured by Hg intrusion method, of at least 30%.

10 Claims, No Drawings

PRODUCTION OF POROUS MULLITE BODIES

This application claims the benefit of U.S. Provisional Application No. 60/102,621 filed Oct. 1, 1998, entitled "Production of Porous Mullite Bodies", by Brundage et al.

BACKGROUND OF THE INVENTION

1. Field of the Invention

The present invention relates to porous mullite-based ceramic articles and a process for the manufacturing the same. The mullite-based ceramic articles are particularly suitable for use as porous filtration devices and/or supports.

2. Discussion of the Related Art

In the field of membrane separations, thin porous membranes deposited on porous supports are widely used for microfiltration and ultrafiltration of liquid media and gas separation. The macroporous support functions to provide mechanical strength for the thin porous membrane. Porous support materials include alumina, cordierite, mullite, silica, spinel, zirconia, other refractory oxides and various oxide mixtures, carbon, sintered metals and silicon carbide.

Several considerations and limitations are important is selecting the appropriate material for the porous support. The porous support should preferably exhibit the following characteristics: (1) a total porosity, as measured by Hg intrusion of greater than 30%; (2) a high permeability; and, (3) pores exhibiting good connectivity, a greater than submicron average pore size and a narrow size distribution. The combined effect of these properties is that the porous support will exhibit both a good filtration efficiency and permeability such that the porous support will be suitable for most microfiltration and ultrafiltration applications. Lastly, for most applications the porous support should exhibit a sufficiently high mechanical strength (MOR) and reasonably high resistance to chemical attack. It is this last characteristic, resistance to chemical attack, that makes mullite a preferred ceramic for these filtration applications. It is known to those skilled in the art, that one conventional method for making sintered mullite structure involves firing, at about 1600° C., a mixed powder of alumina ($Al_2O_3$) and silica ($SiO_2$), the constituent components of mullite; i.e. the reaction sintered formation of mullite bodies. Although mullite structures produced in this manner exhibit sufficient chemical resistance and mechanical strength, the mullite structures formed in this conventional manner are dense and exhibit pores of a submicron average pore size.

One reaction-sintered mullite processing innovation, enabling the formation of mullite structures exhibiting increased pore volume and pore sizes ranging from 30 to 20,000 Å, involved the utilization of a leaching process; U.S. Pat. Nos. 4,601,997, (Speronello) and 4,628,042 (Speronello). In the first reference, the process involves calcining kaolin clay through its exotherm without initiating the formation of substantial mullite. Thereafter, the resultant calcined clay is leached utilizing an alkaline aqueous solution so as to remove silica. Lastly, the leached kaolin clay is washed, dried and calcined at a temperature and for a time sufficient to form mullite. The second Speronello describes mixing hydrous clay, or hydrous clay and calcined clay, thermally convertible to mullite and free silica, with a fugitive binder and thereafter forming the mixture into self-supporting green bodies. The green bodies are then calcined for a time and a temperature sufficient to form mullite crystals and free silica and the calcined bodies are thereafter subject to leaching with an alkali solution to remove the free silica to create pores. As in the previous reference the mullite products produced were characterized by relatively high surface area; e.g., greater than about 15 $m^2/g$, high pore volume, e.g., greater than about 0.22 cc/g, and a high concentration of pores in the range of 150 to 350 Å diameter.

While these Speronello references provided significant advances in the capability of the art to form porous, high strength mullite bodies, through the use of such leaching techniques, the added complexity of leaching in the processing is undesirable. Furthermore, the pore size exhibited by the mullite bodies produced by these techniques, 30 to 20,000 Å is, with the majority between 100 to 600 Å, is less than that desirable for the aforementioned filtration applications.

Mullite formation methods involving the use of pre-reacted mullite powder represent an improvement over the aforementioned reaction sintered methods. Two such reference which disclose the use of pre-reacted mullite powder include U.S. Pat. No. 4,935,390 (Horiuchi et al.) and German Pat. No. 42 26 276 (Levkov).

The Horiuchi reference discloses a method for forming a sintered mullite-based body having improved flexural strength involving heat treating a composition of 80 to 99.1%, and 0.1 to 20%, by weight, of a mullite powder and a sintering aid, yttrium oxide, respectively. Although these bodies exhibit improved flexural strength, the use of this sintering aid results in mullite bodies which are too dense (bulk densities≈3.0 $g/cm^3$) to be suitable for the aforementioned filtration applications.

The Levkov reference discloses a method for the production of a ceramic sintered filter body characterized in that the starting mixture consists of 90–93% mullite, having grains of between 0.63 to 0.1 mm, an opening material, either 4–8% cork scrap or 12–16% rubber scrap, having a grain size of up to a maximum of 0.2 mm, and a binder comprising 5–7% clay and 1–3% $Al_2O_3$; all in weight percent. The filter body so-formed by this method consists predominately of mullite crystals and exhibits a porosity of 50–70% by volume with pore sizes ranging from less than 30 μm to up to 200 μm with a high portion of the average pores ranging in size from 40–100 μm. Although the porosity and pore size is much larger than that possessed by reaction sintered mullite bodies, the porosity, the pore size and pore distribution combine to result in low mechanical strength, low filtration efficiency bodies, not suitable for use as porous supports for use in microfiltration and ultrafiltration applications, specifically those applications involving pressurized liquid.

There is, accordingly, a clear need for a means for producing a porous mullite structure exhibiting an increased average pore size, a narrow pore size distribution, and high permeability, i.e., mullite bodies possessing both high filtration efficiency and high permeability suitable for use in the microfiltration and ultrafiltration of liquid media and gas separation.

SUMMARY OF THE INVENTION

The object of the present invention is to solve the above problems of the prior art and to provide a method for making a sintered ceramic substrate, having mullite as its primary phase, possessing good pore connectivity, increased average intrusion-pore size and a narrowed through- pore size distribution, without the loss of the inherent excellent properties thereof; e.g., mechanical strength, high permeability and total intrusion porosity. The combined effect of the narrowed through-pore size distribution, increased average intrusion-pore size and good pore connectivity is a resultant mullite body that exhibits high permeability and correspondingly, though unexpected, high filtration efficiency.

It has been surprisingly found that when a water swelling clay is used, in combination with the use of pre-reacted mullite powder in the preparation of mullite structures, the resulting ceramic bodies exhibit the above mentioned properties. Specifically, the invention is directed at a composition for use in preparing a sintered substrate having mullite as its primary phase comprised of 75 to 99% by weight pre-reacted mullite powder, and 1.0 to 25% by weight of a water-swelling clay.

This invention also relates to a method for producing a sintered ceramic substrate having mullite as its primary phase, comprising preparing a plasticizable raw material mixture as defined above, adding an organic binder system to the mixture and mixing the mixture to form an extrudable mixture, and extruding the mixture to form a substrate of the desired configuration. The green body is dried and fired for a time and at temperature sufficient to form a sintered mullite structure having a narrow through-pore size distribution comprised of pores exhibiting an average intrusion-pore size of between about 2–15 μm, and a total intrusion porosity, as measured by Hg intrusion, of at least 30%.

DETAILED DESCRIPTION OF THE INVENTION

A plasticizable mixture for use in preparing a ceramic substrate having mullite as its primary phase is prepared according to this invention and comprises, as raw materials, pre-reacted mullite powder and an amount of a water-swelling clay. The relative amounts of these materials which will comprise the admixture will depend on the desired fired composition, but will generally be utilized so that, by weight on an analytical oxide basis, the admixture comprises about 30 to 60% $SiO_2$, 30 to 70%, $Al_2O_3$, and 1 to 10% MgO.

An acceptable source of mullite powder for use a starting raw material may be powder obtained by mixing alumina and silicon oxide, calcining the mixture to form mullite and pulverizing the mullite. An example of an acceptable mullite powder is that manufactured by C-E Minerals (King of Prussia, Pa.) and marketed as Mulcoa®. Generally, the finer the average particle size of the mullite powder the stronger and more chemically durable the so-formed mullite substrate will be while still exhibiting the increased, coarse intrusion pore size and high overall intrusion porosity. Preferably, the mullite powder exhibits an average particle size of less than about 150 μm, and more preferably less than about 50 μm.

An acceptable water swelling clay for use in the present invention is a bentonite-type montmorillonite clay; e.g., Bentolite, manufactured and marketed by Southern Clay Products (Gonzales, Tex.).

The aforementioned raw materials of which the plasticized mixture is comprised are combined in a mixing step sufficient to produce an intimate mixing of the raw material phases to allow complete reaction in thermal processing. A binder system is added at this point to help create an extrudable mixture that is formable and moldable. A preferred binder system for use in the present invention comprises a cellulose ether binder component selected from the group consisting of methylcellulose, methylcellulose derivatives, and combinations thereof, a surfactant component, preferably stearic acid or sodium stearate, and a solvent comprising water. Excellent results have been obtained utilizing a binder system which comprises the following amounts, assuming 100 parts by weight of the inorganic, clay and mullite powder, raw material mixture: about 0.2 to 2 parts by weight of the sodium stearate, about 2.5 to 6.0 parts by weight of a methylcellulose of a hydroxypropyl methylcellulose binder, and about 8 to 30 parts by weight of the water.

The individual components of the binder system are mixed with a mass of the inorganic powder material, e.g., the mullite powder and water-swelling clay mixture, in a suitable known manner, to prepare an intimate mixture of the ceramic material and the binder system capable of being formed into a ceramic body by, for example, extrusion. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process.

The resulting stiff, uniform and extrudable batch mixture is then shaped into a green body by any known conventional ceramic forming process, such as, e.g. extrusion, injection molding, slip casting, centrifugal casting, pressure casting, dry pressing, etc. For the preparation of a honeycomb substrate suitable for use as a porous support for use in microfiltration and ultrafiltration of liquid media and gas separation, extrusion through a die, is preferable.

The prepared ceramic green body is then dried for a period of about 5–20 minutes prior to firing by any conventional method such as hot-air drying or dielectric drying, with dielectric being the preferred method. The dried green body is thereafter fired at a sufficient temperature and for a sufficient time to result in a fired ceramic body containing mullite as its primary phase. The firing conditions can vary depending on the process conditions such as specific composition and nature of the equipment. However, some preferred firing conditions are as follows:

heating the green body to a first temperature of about 600° C. to about 650° C. at a firing rate of about 5° C. to about 25° C. per hour, preferably about 18° C. per hour and thereafter from the first temperature to a second temperature of between about 1400° C. to about 1550° C. at a firing rate of about 10° C. to about 50° C. per hour, and preferably about 25° C. per hour, and holding at the third temperature for about 6 hours to about 16 hours, preferably about 10 hours, and thereafter cooling the green body to room temperature at a cooling rate of about 100° C. to about 200° C. per hour.

As previously mentioned, it has been found that by utilizing a combination of the water-swelling clay and the pre-reacted mullite powder as the main raw material components of the batch mixture, the mixture described herein is most suitable for preparing high strength, high durability high permeability, porous mullite substrates possessing large pores. Although the invention is particularly advantageous for preparing porous substrates suitable for use as porous supports for use in microfiltration and ultrafiltration of liquid media and gas separation, the claimed mixtures can also be used for forming mullite structures for use in other applications including, for example, diesel particulate filters, molten metal filters and catalyst supports.

The sintered mullite bodies formed according to the present invention are characterized by certain properties that are inherent to mullite, including a high chemical durability and permeability and a total porosity, as measured by Hg intrusion, of about 30%. The mullite bodies made according to the present invention are additionally characterized by increased sized pores exhibiting an average pore size, as measured by Hg intrusion,(i.e., intrusion-pores) of between about 2 to 15 µm, as well as a narrow pore distribution, as measured by capillary flow analysis, (i.e., through-pore distribution) wherein substantially all of the through-pores exhibit a size of between 0.5 to 7.5 µm. It is this combination of coarse intrusion-pores and narrow through-pore size distribution that collectively contributes to produce a body that exhibits both a high filtration efficiency and permeability, filter properties not typically found in the same body.

Regarding the filtration efficiency of these inventive mullite bodies, the filtration efficiency is measured according to the National Sanitation Foundation NSF 53-1996 protocol utilizing fine Arizona road dust. Preferably, the mullite bodies described herein exhibit a filtration efficiency of greater than 99.95% at the 25% flow reduction point.

Referring now to the technique for characterizing porosity/pore size and pore distribution, Hg intrusion and capillary flow analysis, respectively, these techniques are complementary regarding the porosity analysis. Put differently, the combination of these two porosity techniques results in a more complete analysis of the ceramic body's porosity.

On the one hand, the capillary flow analysis technique is based upon the principle that capillary forces are inversely proportional to pore size and involves utilizing a liquid which wets a porous material and forcing that liquid into and through the material through the use of a pressurized gas. The lowest pressure at which flow begins is a function of the largest through-pore. The rate of flow of the gas through the body is monitored, and based on the plot of pressure versus flow, the through-porosity can be characterized as to size and quantity. On the other hand, the mercury intrusion technique, involves forcing mercury into a porous body which it does not wet, and from the plot of volume and pressure, inferring the pore size distribution. Besides the inference of the pore size distribution, another shortcoming of the mercury intrusion technique is that coarse pores which are accessible only through small pores will be inferred to have the smaller porosity. Assuming a flat sheet having large exterior pores which are connected by small necks or through-pores, it can be seen that the combination of techniques gives a more complete analysis of the porosity. Specifically, mercury intrusion reveals that flat body is a porous one with pores the size of these coarse pores, while capillary flow analysis reports the porosity of the same flat body in terms of the through-pores.

In another embodiment, the plasticizable mixture can additionally include materials suitable for use as pore-forming agents, including but not limited to, graphite, cherry pit flower, wood chips, saw dust and starch. The effect of adding these pore-forming agent is that the average size of the pores formed is greater than those sintered mullite bodies without the pore-forming agent; i.e. the average intrusion pore size being typically between about 10–15 µm.

While not intending to be limited by theory the mechanism by which the water swelling clay expands the structure and results in an increased mean pore size is thought be due to the cations holding the negatively charged clay layers together. Alkali and alkaline earth cations are adsorbed in the layers of montmorillonite, forming a bridge between the layers. The distance between the layers increases with the amount of water present and the size of the adsorbed cation increasing the effective volume occupied by the solid. In the case of sodium ions, the zeta potential in the internal surfaces is high and the electrostatic repulsion forces are significant and long range. Eventually a balance occurs between the attractive and repulsive forces. It is this swelling phenomenon which expands the green substrate thereby leaving large pores in the subsequently fired structure.

EXAMPLES

To further illustrate the principles of the invention of the present invention, there will be described several examples of the mullite bodies formed according to the invention. However, it is to be understood that the examples are given for illustrative purpose only, and the invention is not limited thereto, but various modifications and changes may be made in the invention, without departing from the spirit of the invention.

Examples 1–15

Inorganic powder batch mixtures suitable for the formation of a ceramic body having mullite as its primary crystalline phase are listed in TABLE I; as listed in percent by weight. Each of compositions 1–15 were prepared by combining and dry mixing together the components of the designated inorganic mixture as listed in TABLE I. An amount of the organic binder system listed in TABLE I was then added to each of the inorganic dry mixtures and thereafter further mixed to form a plasticized ceramic batch mixture. Each of these 15 different plasticized ceramic batch mixtures comprised differing amounts of the binder system components, as detailed in TABLE I; ranging from 24.75 to 35 parts by weight, based on 100 parts total inorganics.

Each of the various plasticized mixtures were extruded through an extruder under conditions suitable to form 100 cell/in. ceramic honeycomb substrate logs exhibiting a diameter of 1 to 1¼ in., a cell wall size of 24 mils and a length of between about 1 to 2 in. The ceramic honeycomb green logs formed from each of the 15 batch compositions were dried for approximately 10 minutes, cut into 3 in. substrates and thereafter subjected to a heating and firing cycle sufficient to remove the organic binder system from, and to sinter, the honeycomb substrates. Specifically, the green substrates were fired were fired to between 1400 and 1550° C. and held for a period of about 10 hours; i.e., firing conditions suitable for forming ceramic bodies having mullite as their primary phase.

The bulk density, mean intrusion pore size and through-pore distribution, total intrusion porosity and the mechanical strength of the mullite honeycomb substrates were measured. The bulk density was measured utilizing the ASTM "water boil" test and is reported in g/cc. The intrusion porosity data was generated utilizing a conventional mercury intrusion porosimetry technique using a mercury porosimeter manufactured by the Micromeritics Corp, specifically the Autopore II 9220 V3.04. The through-pore distribution data was generated using the aforementioned capillary flow analysis. The filtration efficiency data was generated utilizing the aforementioned National Sanitation Foundation test. Permeability data is 16 mil data using conventional methods of testing permeability and is reported in ml per minute per inch squared per inch water column. The mechanical strength, modulus of rupture (MOR) or flexure strength, was measured on 5/16 in. rods, produced in the same manner as the honeycomb substrates, and is reported in psi units.

Examples 8 and 13, inventive mullite bodies exhibiting representative properties which can be predictably obtained in the instant invention, each exhibited a high filtration efficiency (>99.95%) and a correspondingly high 16-mil permeability (>0.75), as a result of the narrow through-pore size distribution each possessed, 0.7 to 3.5 and 0.6 to 5.5 $\mu$m, respectively. For comparison purposes, a standard cordierite

TABLE I

|  | 1* | 2* | 3* | 4 | 5 | 6 | 7 |
|---|---|---|---|---|---|---|---|
| INORGANICS | | | | | | | |
| Mullite powder | — | 100.0[1] | 90.0[2] | 90.0[2] | 90.0[1] | 85.0[1] | 80.0[1] |
| Water Swelling Clay | — | — | — | 10.0[4] | 10.0[4] | 15.0[4] | 20.0[4] |
| Kaolin clay | 53.75 | — | 10.0 | — | — | — | — |
| Alumina | 46.27 | | | | | | |
| BINDER | | | | | | | |
| Methocel | 4.0 | 4.0 | 6.0 | 6.0 | 6.0 | 6.0 | 6.0 |
| Stearic Acid | 1.0 | 1.0 | 0.5 | 1.0 | 1.0 | 1.0 | 1.0 |
| Water | 30.0 | 30.0 | 21.0 | 21.0 | 23.0 | 23.0 | 25.0 |
| PROPERTIES | | | | | | | |
| % Hg Porosity | 47.8 | 40.5 | 39.2 | 38.4 | 42.1 | 37.2 | 36.7 |
| Mean Pore Size ($\mu$m) | 0.5 | 3.5 | 3.7 | 6.0 | 8.5 | 9.0 | 9.5 |
| MOR (psi) | 2503 | | | | | | |
| Bulk Density (g/cc) | 1.77 | 1.83 | 1.89 | 1.89 | 1.89 | 1.92 | 1.96 |

|  | 8 | 9* | 10* | 11 | 12* | 13* | 14 | 15* |
|---|---|---|---|---|---|---|---|---|
| INORGANICS | | | | | | | | |
| Mullite powder | 90.0[3] | 100.0[1] | 100.0[3] | 95.0[3] | 90.0[3] | 90.0[3] | 63.0[1] | — |
| Water Swelling Clay | 10.0[5] | — | — | 5.0[5] | — | — | 7.0[5] | — |
| Kaolin clay | — | — | — | — | 10.0 | 10.0 | — | 35.6 |
| Talc | — | — | — | — | — | — | — | 30.85 |
| Alumina | — | — | — | — | — | — | — | 10.46 |
| Graphite | | | | | | | 30.0 | 23.03 |
| BINDER | | | | | | | | |
| Methocel | 3.75 | 3.75 | 3.75 | 3.75 | 3.75 | 3.75 | 3.75 | 4.0 |
| Stearic Acid | 1.0 | 1.0 | 1.0 | 1.0 | 1.0 | 1.0 | 1.0 | 0.5 |
| Water | 23.5 | 22.5 | 22.5 | 22.5 | 21.0 | 20.0 | 29.5 | 27.0 |
| PROPERTIES | | | | | | | | |
| % Hg Porosity | 37.6 | 37.6 | 34.5 | 33.8 | 30.1 | 31.5 | 62.1 | 27.0 |
| Mean Intrusion-Pore Size ($\mu$m) | 3.83 | 3.74 | 2.53 | 2.92 | 2.48 | 2.33 | 10.6 | 10.4 |
| Through-Pore size range ($\mu$m) | 0.7–3.5 | — | — | — | — | — | 0.6–5.5 | 0.8–12.2 |
| MOR(psi) | 6670 | 2654 | 4883 | 5695 | 5536 | 5828 | — | |
| Filtration Efficiency (%) | 99.995 | — | — | — | — | — | 99.95 | >99.95 |
| Permeability (ml/min./m²/in.) | 1.0 | — | — | — | — | — | 0.75 | 1.1 |

*comparative
[1]C-E Minerals (King of Prussia, PA) Mulcoa 70–200
[2]C-E Minerals Mulcoa 70–100
[3]C-E Minerals Mulcoa 70–325
[4]Georgia Kaolin (now Dry Branch Kaolin) GK-129 Bentonite
[5]Southern Clay Products (Gonzales, TX) Bentolite L As these examples show, incorporation of the water swelling clay, such as the two bentonite-type clays used, in amounts of up to about 20% in combination with the use of pre-reacted mullite into the batch mixture results in sintered mullite-based ceramic substrates which exhibit a total porosity of nearly 40%, an increased average intrusion pore size of between 3–10 $\mu$m, when compared to the prior art reaction sintered mullite bodies (Example 1). Furthermore, body, Example 15, was measured for through-pore distribution, filtration efficiency and permeability. Although the 16-mil permeability of this comparison sample was higher than the inventive mullite samples (1.1) it exhibited a filtration efficiency of less than 99.95%, due, in part, to the wide through-pore distribution it exhibited, 0.8 to 12.2.

The increased average intrusion pore size and narrowness of the through-pore size distribution and resultant filtration efficiency of these inventive mullite bodies without the loss of the inherent excellent properties thereof; e.g., sufficient mechanical strength (MOR), permeability and total intrusion porosity makes these inventive mullite substrates suitable for use as filter and/or filter supports in the microfiltration and ultrafiltration of liquid media and gas separation.

We claim:

1. A method for producing a sintered ceramic substrate having mullite as its primary phase, comprising the following steps:

preparing a plasticizable inorganic raw material mixture having a chemical composition comprising, in percent by weight, of 30 to 60% $SiO_2$, 30 to 70%, $Al_2O_3$, and 1 to 10% MgO, the raw material mixture comprising an amount of pre-reacted mullite powder and an amount of a water-swelling clay;

adding an organic binder system to the inorganic mixture;

kneading the inorganic mixture;

extruding inorganic mixture to form a green substrate; and thereafter, firing the substrate for a time and at temperature sufficient to form a sintered mullite structure.

2. The method for producing a sintered ceramic substrate having mullite as its primary phase, as claimed in claim 1 wherein the composition consists, by weight, of 75 to 99% of the mullite powder and 1.0 to 25% of the water swelling clay.

3. The method for producing a sintered ceramic substrate having mullite as its primary phase, as claimed in claim 1 wherein the composition consists, by weight, of 87.5–97.5% of the mullite powder and 2.5 to 12.5% of the water swelling clay.

4. The method for producing a sintered ceramic substrate having mullite as its primary phase, as claimed in claim 1 wherein the composition consists, by weight, of 87.5–97.5% of the mullite powder and 2.5 to 12.5% of the water swelling clay.

5. The method for producing a sintered ceramic substrate having mullite as its primary phase, as claimed in claim 1 wherein the composition further comprises 10 to 50 parts, by weight, of a pore forming agent, based on 100 parts by weight of the total of the mullite powder and the water swelling clay.

6. The method for producing a sintered ceramic substrate having mullite as its primary phase, as claimed in claim 1 wherein the pore forming agent is selected from the group consisting of graphite, cherry pit flour, wood chips, saw dust and starch.

7. The method for producing a sintered ceramic substrate having mullite as its primary phase, as claimed in claim 6 wherein the composition further includes 30 to 45 parts of graphite, based on 100 parts by weight of the total of the mullite powder and the water swelling clay.

8. The method for producing a sintered ceramic substrate having mullite as its primary phase, as claimed in claim 1 the mullite powder exhibits an average particle size no greater than about 150 µm.

9. The method for producing a sintered ceramic substrate having mullite as its primary phase, as claimed in claim 1 the mullite powder exhibits an average particle size no greater than about 50 µm.

10. The method for producing a sintered ceramic substrate having mullite as its primary phase, as claimed in claim 1 wherein the water swelling clay is a montmorillonite bentonite clay.

* * * * *